United States Patent
Askins et al.

[15] 3,701,278
[45] Oct. 31, 1972

[54] TEST APPARATUS FOR COMBUSTION EVALUATION

[72] Inventors: Robert E. Askins; George P. Roys, both of Huntsville, Ala.

[73] Assignee: Thiokol Chemical Corporation, Bristol, Pa.

[22] Filed: Feb. 17, 1970

[21] Appl. No.: 12,081

[52] U.S. Cl. ...........................73/35, 60/251, 60/254, 60/260, 60/267, 60/233, 73/167
[51] Int. Cl. .................................................G01l 5/14
[58] Field of Search....................................73/35, 167

[56] References Cited

UNITED STATES PATENTS

| | | | |
|---|---|---|---|
| 2,493,725 | 1/1950 | McMorris | 73/35 |
| 3,159,997 | 12/1964 | Talton et al. | 73/35 |
| 3,201,973 | 8/1965 | Fitzgerald et al. | 73/35 |
| 3,225,589 | 12/1965 | Spangler et al. | 73/35 |
| 3,267,721 | 8/1966 | Jacobs et al. | 73/35 |

*Primary Examiner*—Richard C. Queisser
*Assistant Examiner*—Marvin Smollar
*Attorney*—William R. Wright, Jr.

[57] ABSTRACT

A combustion chamber for testing under actual burning conditions the ability of air augmented solid propellants to meet operational requirements under subsonic or supersonic environments.

10 Claims, 15 Drawing Figures

Fig. 2

Robert E. Askins
George P. Roys  INVENTORS

BY  *Rob't Williamson*

ATTORNEY

Robert E. Askins INVENTORS
George P. Roys

BY Rob H Williams

ATTORNEY

Robert E. Askins INVENTORS
George P. Roys

BY

ATTORNEY

TEST APPARATUS FOR COMBUSTION EVALUATION

BACKGROUND OF THE INVENTION

1. Field of the Invention

It became evident in the rocket industry that there was need for equipment that could provide a simple relatively accurate and inexpensive procedure for screening the specific formulations of air augmented solid propellants under operational requirements.

Such equipment had to be able to conduct such procedure in either subsonic or supersonic environments and as a result of this requirement the testing apparatus embodying the invention was developed and has proved entirely satisfactory in obtaining the desired information.

2. Description of the Prior Art

The development of air augmented propulsion systems required new capabilities than those that had been required normally for the development of conventional solid propellant rocket propulsion systems.

While static test facilities had been used for conventional solid propellant rocket motors, little had been done toward testing air augmented propulsion systems because this was a somewhat new concept that had been introduced into the rocket industry.

Ram-jets had been discussed, but no test facilities had been developed for testing them, the present invention is believed, therefore, to be a new achievement in the rocket industry, because it meets a new requirement that had not been previously established.

SUMMARY OF THE INVENTION

This invention relates, therefore, to testing equipment that has the ability to test predetermined amounts of air augmented solid propellants under actual burning conditions and to permit such tests to be conducted under subsonic or supersonic environments.

There are four characteristics of subsonic or supersonic combustion which can be examined with the instant apparatus without introducing undue complexity:

A. Ignition or lack of ignition of the primary rocket motor exhaust products in the secondary chamber.

B. Under different sets of conditions the induction distance for ignition in the secondary chamber may be found.

C. The pressure or temperature rise along the length of the secondary chamber may be determined.

D. The composition of the exhaust products from the secondary chamber.

It is also well-known that combustion characteristics are varied by changes in the inlet air temperature, pressure, and velocity; along with any changes that may occur in the secondary combustion chamber section.

The apparatus is capable, because of measured flow and temperature capabilities, to simulate Mach 4.0 flight at sea level, this permits the apparatus, therefore, to utilize both subsonic and supersonic combustions.

The object of this invention, therefore, is to provide a test apparatus for the combustion evaluation of air augmented solid propellant under subsonic or supersonic flight conditions.

In the development of fuel-rich solid propellants for air augmented applications a complication is introduced by the requirement that the products resulting from the combustion of the solid propellant, be capable of additional combustion with air. A factor in the earlier phases of solid propellant air augmentation development was the lack of sufficient accurate data concerning the secondary combustion as set forth.

The instant invention was, therefore, developed to analyze the secondary combustion that occurs with air augmented solid propellants and provide accurate data that could be used to determine the combustion behavior when the solid propellants are used in an air augmented ducted rocket.

It is believed that from the following description of the mode of operation of the invention, that other objects and advantages will become apparent to a person skilled in the art when taken in conjunction with the accompanying drawings in which:

DESCRIPTION OF THE PREFERRED EMBODIMENTS

Figure 1:
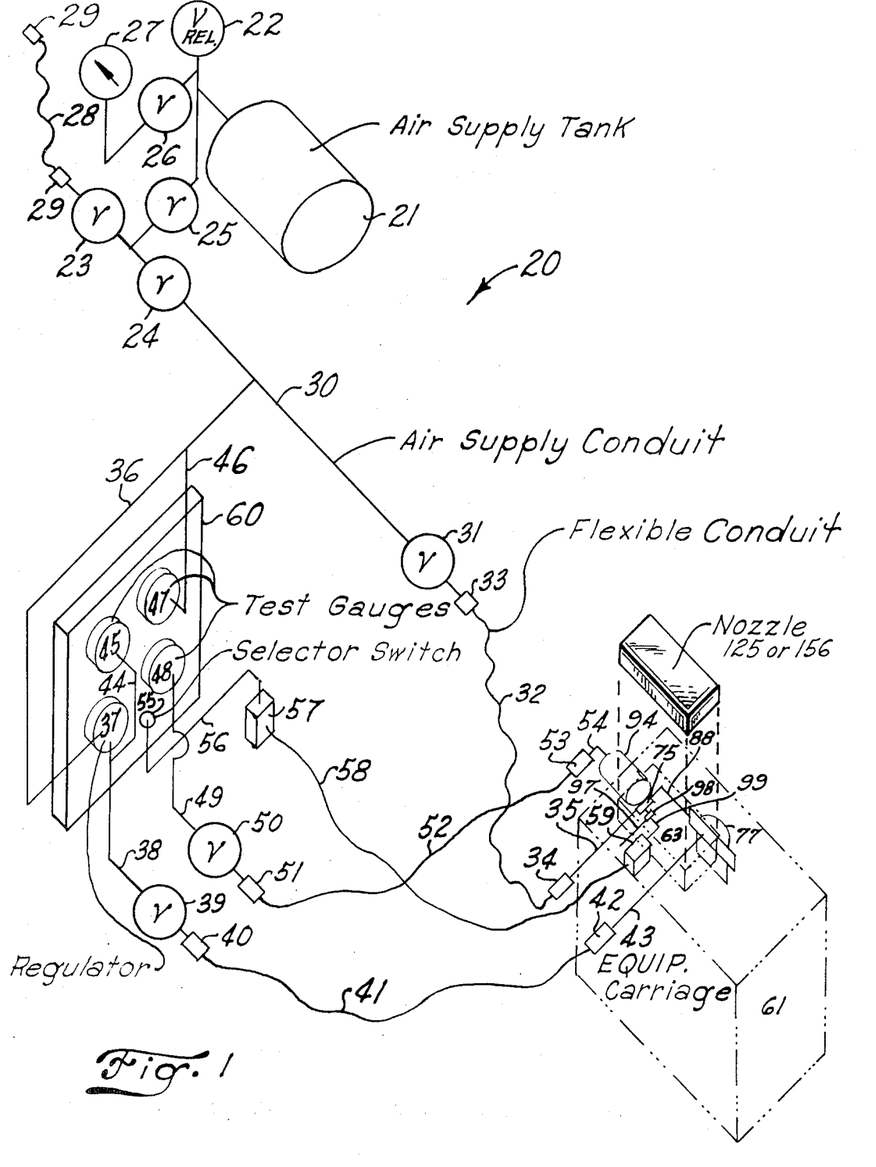
FIG. 1 is a schematic view of equipment that is required for the operation of the test apparatus embodying the invention.

Referring more in detail to the drawings wherein like parts are designated by like reference numerals and more especially to FIG. 1 wherein the reference numeral 20 is used to designate a facility which includes the various pieces of equipment that are necessary for the operation of the test apparatus embodying the invention.

The facility 20 includes a compressed air supply storage tank 21 which is connected by suitable conduits to a pop-safety relief valve 22 and to gate valves 23, 24, 25 and 26 all of which control the flow of air under pressure from the tank 21. A pressure gauge 27 is also connected by the suitable conduits to indicate the air pressure within the tank 21. A flexible supply conduit 28, having suitable couplings 29 on the opposite ends thereof, provide means whereby compressed air may be supplied to the tank 21.

An air supply conduit 30 is connected to the gate valve 24 and then extends to a gate valve 31 and then to be connected to a flexible conduit 32 by a coupling 33. The flexible conduit 32, by means of a coupling 34, is connected to a conduit 35 which will be connected to the test apparatus as will be later described.

Another conduit 36 is suitably connected to the air supply conduit 30 and extends to a regulator 37 which in turn is connected to a gate valve 39 by a conduit 38 which is connected by a coupling 40 to a flexible conduit 41 that is connected by a coupling 42 that is also connected to a conduit 43 which will be connected to the test apparatus as will be later described.

The conduit 38 is suitably connected to a conduit 44 that is connected to a test gauge 45 and a conduit 46 connects the conduit 36 directly to a second test gauge 47.

A third test gauge 48 is connected by a conduit 49 to a gate valve 50 which is then connected by a coupling 51 to a flexible conduit 52 which by a coupling 53 is connected to a conduit 54 that is connected to the test apparatus depending on the tests that are being conducted.

A selector switch 55 is connected by a line 56 to a receptacle 57 which in turn is connected by line 58 to a receptacle 59 that is connected to the test apparatus as will be later described. As shown the test gauges 45, 47 and 48, regulator 37 and selector switch 55 are all mounted on a panel 60 for convenience and observation during the testing periods.

Figure 2:
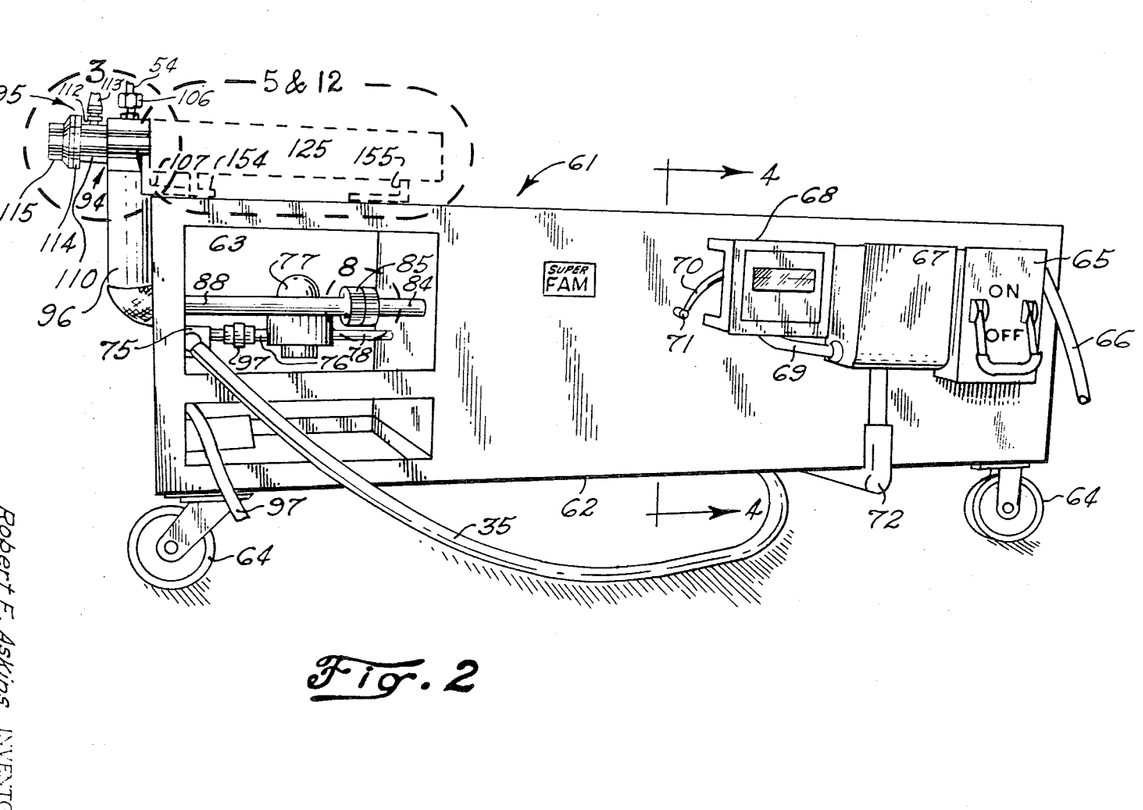
FIG. 2 is an elevational view of the equipment carriage that houses the air heating and control components for the test apparatus.

As shown by dotted lines in FIG. 1 and more specifically in FIG. 2, the test apparatus comprises what is termed an equipment carriage 61 that includes a boxlike body 62 that has a cavity 63 at one end thereof and is provided for the sake of mobility with dolly wheels 64. Mounted on the exterior surface of one side of the body 62 is a conventional safety switch 65 to which is connected an electric cable 66 that is connected to an electrical power source. Mounted adjacent the safety switch 65 is an electrical control 67 and adjacent that is mounted an indicating on-off device 68 for the control 67 and all three are connected together by a cable 69. While the indicating device 68 is connected by a line 70 to a thermocouple 71 and the control 67 has an electrical cable 72 connected thereto.

Figure 4:
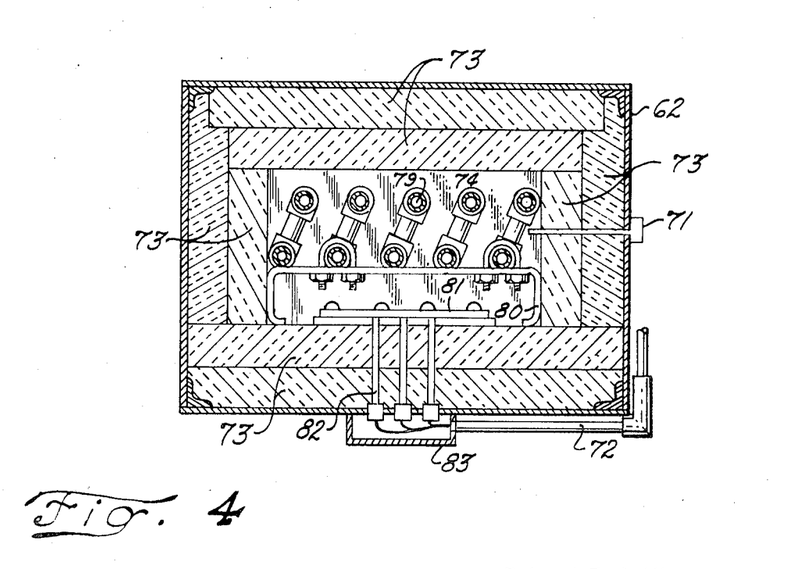
FIG. 4 is a transverse sectional view on the line 4—4 of FIG. 2.

Viewing FIGS. 2 and 4, it will be seen that the body 62 is lined with slabs of insulation 73 which are positioned to leave a longitudinally extending chamber or cavity 74 within and surrounded by the insulation 73, it will also be noted that the thermocouple 71 extends into the chamber 74. The conduit 35 (FIG. 1) is connected to an inlet box 75 to which is connected a conduit 76 that is connected to a regulator 77 and extending from the regulator 77 into the chamber 74 in the body 62 is a conduit 78 that within the chamber 74 is formed into a coil 79 which is supported by one or more brackets 80. Extending through the chamber 74 longitudinally thereof and resting on the insulation 73 are electrical heating elements 81 which by conductors 82 are connected to the cable 72 within a junction box 83 that is mounted on the bottom of the body 62.

Figure 8:
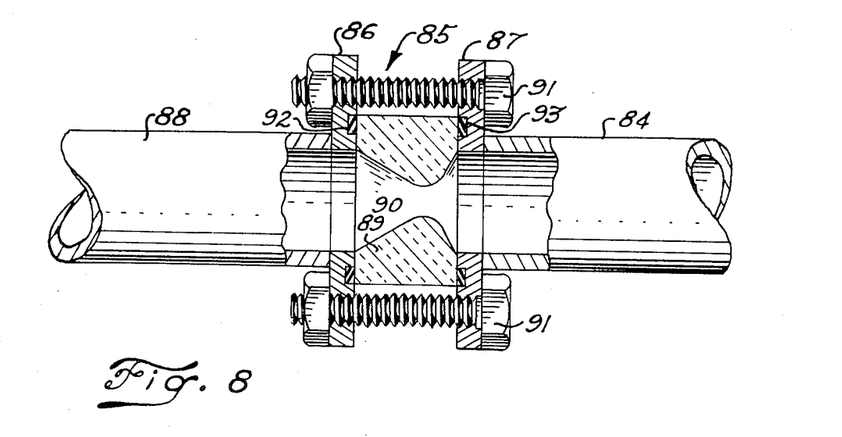
FIG. 8 is a diagrammatical sectional view of the venturi choke or control for the air entering the primary motors of the test apparatus.
Figure 9:
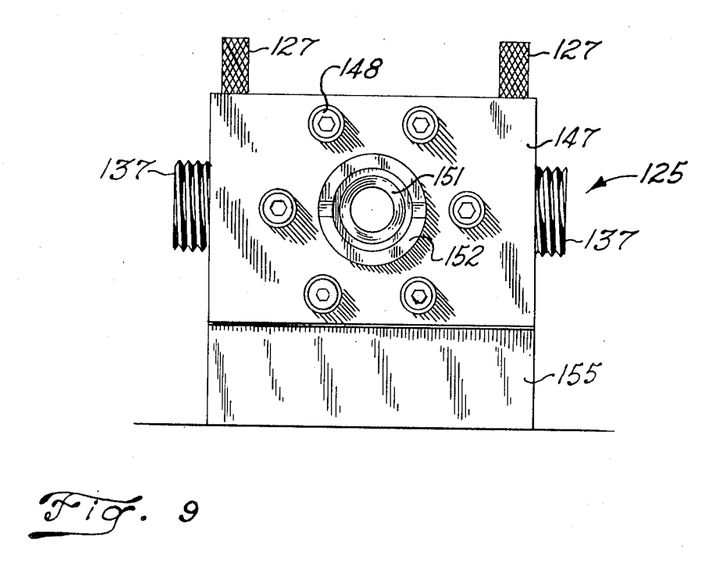
FIG. 9 is an elevational end view of the component of FIG. 5 taken on the line 9—9 thereof.

Extending from the coil 79 is a conduit 84 that is connected to a venturi choke or control 85 (see FIG. 8) that comprises a pair of apertured disks 86 and 87, the disk 86 being connected to a conduit 88 and the disk 87 being connected to the conduit 84. Positioned between the disks 86 and 87 is a circular block 89 the center of which is contoured as at 90 to resemble a divergent-convergent nozzle which is alined with the conduits 84 and 88. Fasteners 91 secure the disks 86 and 87 in position as shown in FIG. 8 and circular gaskets 92 and 93 mounted in the inner surfaces of the disks 86 and 87 seal the block 89 to prevent leakage of air therefrom.

Figure 3:
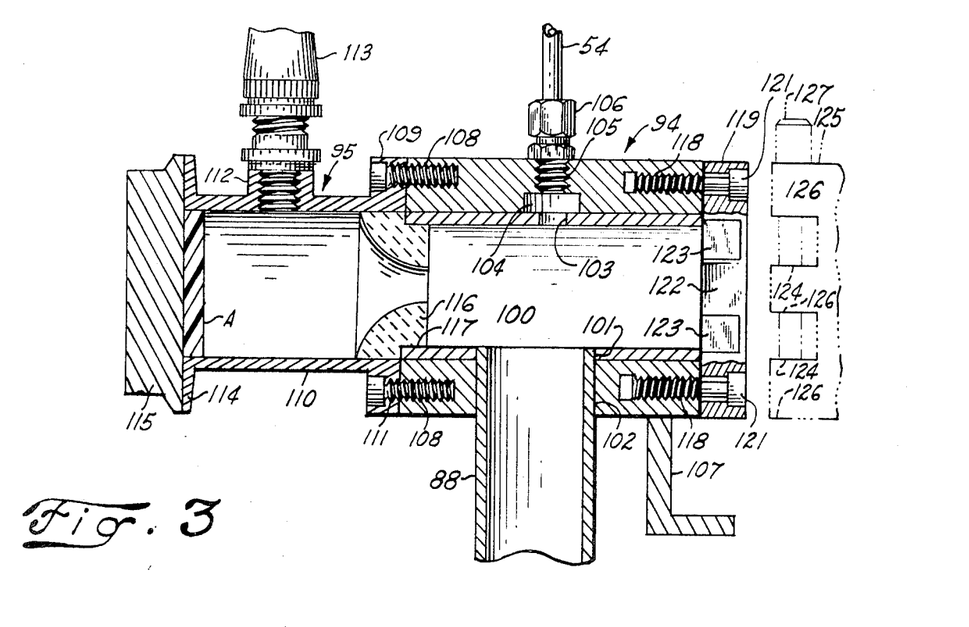
FIG. 3 is a sectional view of a primary motor that is positioned in the area shown in the dotted circle 3 in FIG. 2.

The conduit 88 extends to a cylindrical plenum chamber 94 at the end thereof which is mounted in relation to the equipment carriage 61 as shown in FIG. 2 and a small rocket motor 95 is connected to the head end of the plenum chamber 94 as shown in FIG. 3, and the conduit 88 between the body 62 and the plenum chamber 94 is covered with insulation 96. Unions 97 may be interpolated in conduits 76 and 78 for removal of the regulator 77 as desired and a secondary source of air under pressure is fed to the equipment carriage 61 by a flexible conduit 97 that is connected to an electrically operated valve 98 that is connected to and controls the flow of air from the inlet box 75. The conduit 43 is connected to the regulator 77 and a line 99 extends from the receptacle 59 to the valve 98 all as shown in FIG. 1.

The plenum chamber 94 has a liner sleeve 100 positioned therein that is provided with an opening 101 to receive the end of the conduit 88 that extends through an opening 102 in the plenum chamber 94 whereby the conduit 88 is in communication with the plenum chamber 94. Directly opposite to the opening 101 the sleeve 100 is provided with a second opening 103 which communicates with a circular cavity 104 that is alined with an internally threaded bore 105 that receives a coupling 106 whereby the plenum chamber 94 is connected to the conduit 54. The plenum chamber 94 is rigidly mounted on the top of the equipment carriage 61 by means of an L-shaped bracket 107 and the head end of the plenum chamber 94 is provided with a circular row of internally threaded bores 108 whereby an annular flange 109 at the aft end of a motor case 110 for the rocket motor 95 is connected to the head end of the plenum chamber 94 by bolts (not shown) that will extend through countersunk internally threaded bores 111 in the flange 109 into the bores 108 in the head end of the plenum chamber 94 when such bores are in alinement with each other. The motor case 110 is provided with an internally threaded boss 112 which receives an ignition 113, and a second annular flange 114 on the head end of the motor case 110 is removably secured by any well-known means to a closure plate 115 for the motor case 110. During the operation of the test apparatus, a disk-shaped charge of a solid propellant grain A will be positioned in the head end of the motor case 110 in contact with the closure plate 115 as shown in FIG. 3 and as will be later described. The aft end of the motor case 110 within the flange 109 has positioned therein a circular inverted nozzle 116 and the head end of the liner 100 engages an annular shoulder 117 in the periphery of the nozzle 116 to retain it in position in the motor case 110 as shown in FIG. 3 so that the nozzle 116 is in communication with the plenum chamber 94.

The aft end of the plenum chamber 94 is also provided with a circular row of internally threaded bores 118 whereby a plate 119 corresponding in size to the peripheral area of the plenum chamber 94 is secured thereto by bolts 120 that will extend through countersunk bores 121 in the plate 119 into the bores 118 when such bores are in alinement with each other.

The side edges of the plate 119 are provided with a plurality of equally spaced cutouts 122 that form therebetween a plurality of projections 123 each of which are provided with a centrally located aperture for a purpose to be later described.

The projections 123 on the plate 119 are received in equally spaced cutouts 124 at the aft end of a sub-sonic secondary combustion chamber 125 that at times is referred to as a "nozzle" by personnel performing the test. A plurality of projections 126 are formed at the aft end of the combustion chamber 125 by the cutouts 124 and each of the projections 126 are provided with a centrally located aperture so that when these apertures are alined with the apertures in the projections 123 latching pins 127 are sled into the alined projections to removably secure the combustion chamber 125 to the plate 119.

The plate 119 is provided with a centrally located opening 128 and an annular flange 129 on the plate 119 surrounds the opening 128 on the inside of the plate 119 and a groove 130 is provided on the exterior surface of the flange 129 to receive a gasket 131 that provides a leak proof connection between the plate 119 and an annular cutout 132 at the aft end of the combustion chamber 125 in which the flange 129 is seated.

Figures 5, 6, 7:
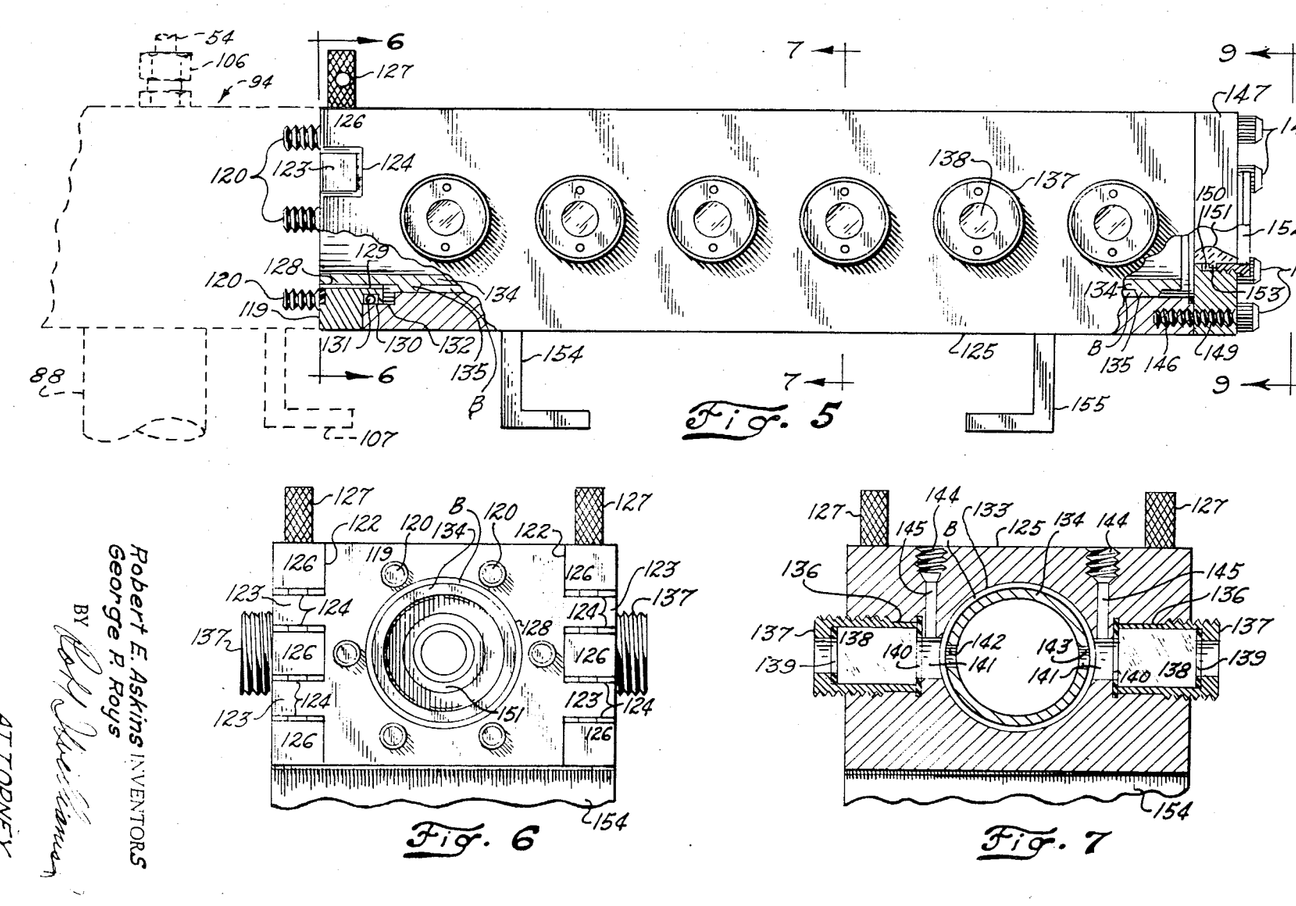
FIG. 5 is a side elevational view of the subsonic combustion component of the test apparatus.
FIG. 6 is an elevational end view of the component of FIG. 5 taken on the line 6—6 thereof.
FIG. 7 is a transverse sectional view taken on the line 7—7 of FIG. 5.

The opening 128 in the plate 119 is alined with a longitudinally extending centrally located circular chamber 133 in the combustion chamber 125 and a liner sleeve 134 positioned in the chamber 133 abuts at the head end thereof with the aft end of the liner sleeve 100 in the plenum chamber 94 and the exterior surface of the sleeve 134 is provided with a plurality of relatively spaced feet 135, FIG. 5, to space the sleeve 134 from the insurface of the chamber 133 to provide a longitudinally extending circular gap B therebetween.

The opposite sides of the combustion chamber 125 are each provided with a longitudinally extending row of partially internally threaded openings 136 into each of which is threaded a partially externally threaded viewing port 137 in each of which is mounted a sight glass 138. Gaskets 139 and 140 at opposite ends of the sight glass 138 provide a leak proof assembly. Each of the openings 136 communicate with the gap B in the chamber 133 by means of a reduced opening 141 and each of the openings 141 communicate with the chamber 133 by oppositely disposed ports 142 and 143 in the liner sleeve 134. Thus, the interior of the chamber 133 can be viewed through the ports 137. A pair of parallel longitudinally extending rows of internally threaded inlet ports 144 are provided in the top of the combustion chamber 125 and each of the ports 144 are in vertical alinement with the openings 141 and communication therewith by means of vertically disposed passages 145.

The aft end of the combustion chamber 125 is provided with a circular row of internally threaded bores 146 whereby a plate 147 of the same peripheral size as the combustion chamber 125 is secured to the aft end of the combustion chamber 125 by bolts 148 that extend through internally threaded bores 149 in the plate 147 into the bores 146 in the aft end of the combustion chamber 125.

The plate 147 is provided with a centrally located partially threaded opening 150 in which is positioned a nozzle 151 and an externally threaded retaining ring 152 threaded into the opening 150 and engaging an annular ridge 153 on the periphery of the nozzle 151 serves to retain the nozzle 151 in position in the plate 147 and the combustion chamber 125 is mounted on the carriage 61 by means of a pair of L-shaped brackets 154 and 155.

In FIGS. 10 to 15 inclusive, there is shown a supersonic secondary combustion chamber 156 which for certain tests will replace the subsonic secondary combustion chamber 125 as will be later described.

Figure 10:
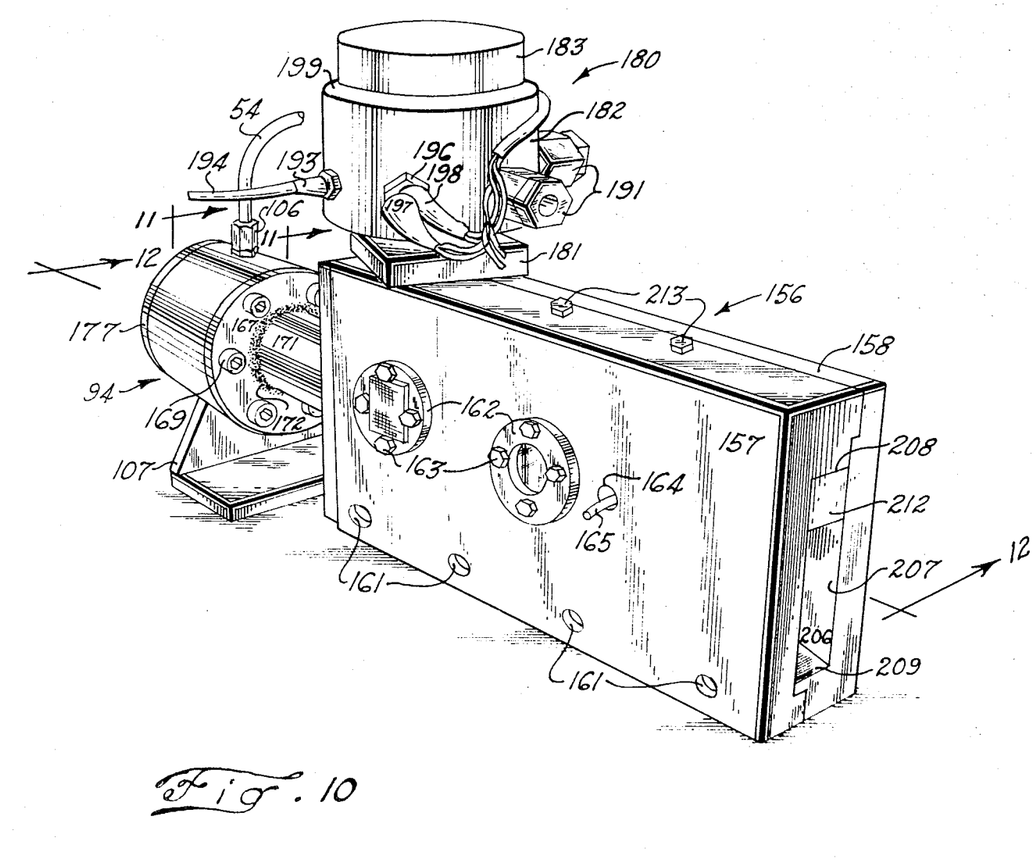
FIG. 10 is a perspective view of the supersonic combustion component of the test apparatus.
Figure 14:
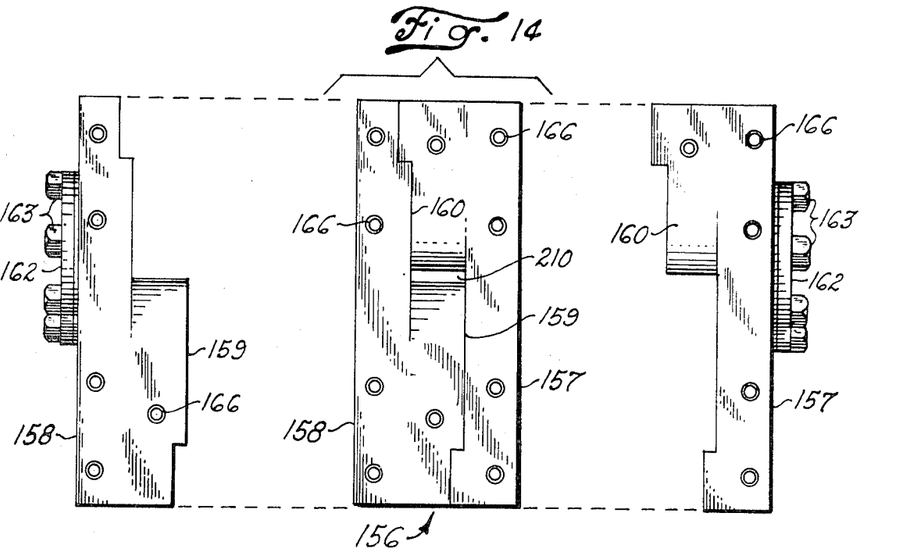
FIG. 14 is an exploded view of one end of the component of FIG. 10 and is taken on the line 14—14 of FIG. 12.
Figure 15:
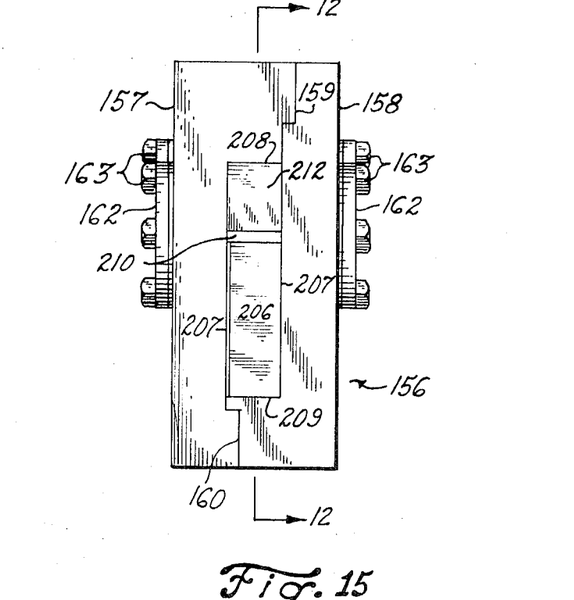
FIG. 15 is an elevational view of another end of the component of FIG. 10 and is taken on the line 15—15 of FIG. 12.

The combustion chamber 156 comprises two parts 157 and 158 that have vertically disposed mating edges 159 and 160 that are nested in vertical relation to each other as shown in FIGS. 14 and 15. Each of the parts 157 and 158 have a longitudinal row of openings 161 at the bottom of part 157 and at the top of part 158 to receive suitable bolts whereby the parts 157 and 158 may be nested together and retained in this position as shown in FIG. 10. Each of the parts 157 and 158 have viewing ports 162 provided therein which are retained in place by bolts 163.

The part 157 has an opening 164 therein adjacent one of the viewing ports 162 through which a pressure tap 165 extends and the aft end of the parts 157 and 158 are provided with a plurality of internally threaded bores 166.

The plenum chamber 94 in these Figures is basically the same as previously described, except that the plate 119 is replaced by a circular plate 167 which has a central opening 168 therein and is secured the plenum chamber by bolts 169 entering the bores 118 through openings 170 in the plate 167, a conduit 171 has one end thereof inserted into the opening 168 and is rigidly secured to the plate 167 by welding 172 as shown in FIG. 10. The conduit 171 at its aft end abuts the sleeve 100 in the plenum chamber 94 and at the head end thereof enters the central opening 173 of a plate 174 which is secured to the combustion chamber 156 by bolts 175 entering the bores 166 through openings 176 in the plate 173.

In these Figures the rocket motor 95 is eliminated and a closure plate 177 is secured to the plenum chamber 94 by bolts 178 entering the bores 108 in the plenum chamber through the openings 179 in the closure plate 177.

In the use of the combustion chamber 156 the rocket motor 180 is mounted on the top thereof and comprises an aft end 181, a central case portion 182 and a head end closure 183. The aft end 181 is connected to the part 157 of the combustion chamber 156 by an externally threaded boss 184 that enters the internally threaded bore 185 in the part 157 and the aft end 181 has a throat portion 186 that communicates with a nozzle 187 that is positioned in an opening 188 in the part 157. The head end of the aft end 181 is welded at 189 within the combustion chamber 190 in the case portion 182 which is provided with blow out plugs or ports 191 and has an internally threaded bore 192 to receive a thermo-couple 193 having an electric feed line 194 and an internally threaded bore 195 is provided to receive an igniter 196 that is provided with plus and minus electric feed lines 197 and 198.

Figure 12:
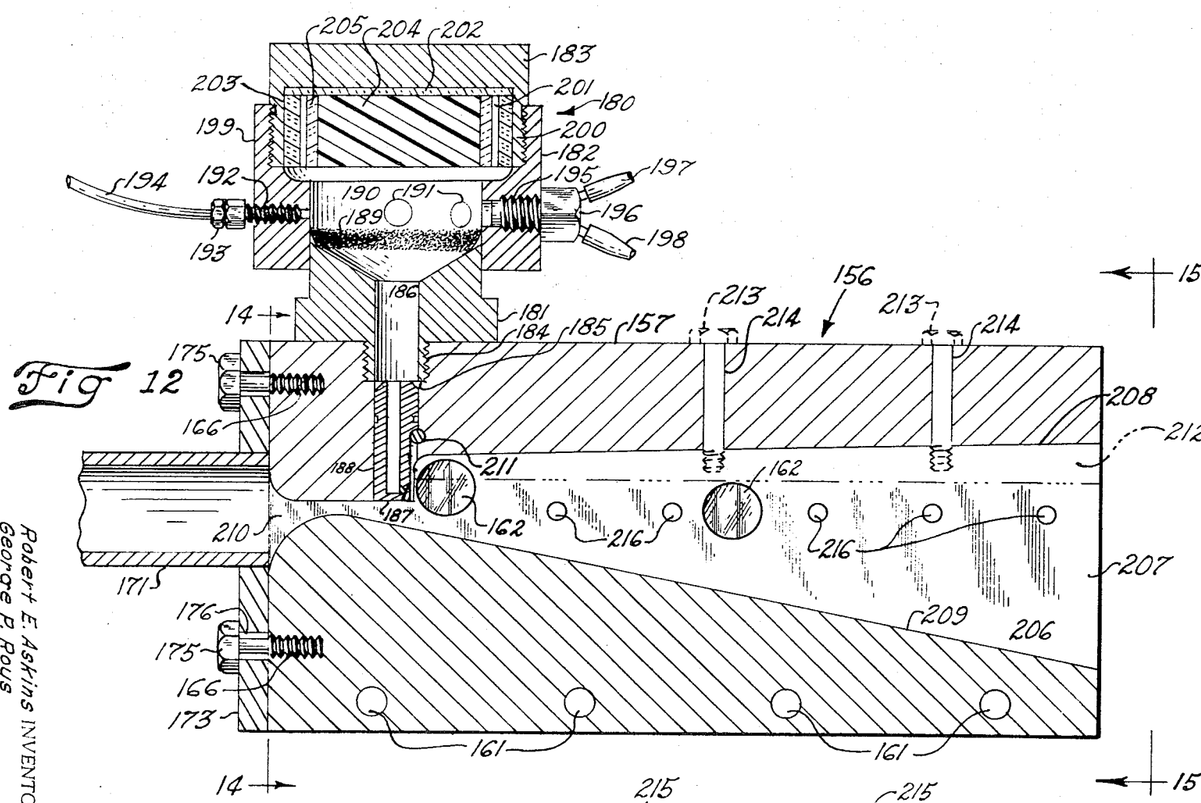
FIG. 12 is a longitudinal sectional view taken on the line 12—12 of FIG. 10 and line 12—12 of FIG. 15.

The case portion 182 is provided with an internally threaded annular flange 199 into which is threaded a reduced externally threaded projection 200 on the head end 183 which is provided with a cavity 201 that is lined with insulation 202 and 203 and a solid propellant 204 having a liner 205 thereon is positioned within the head end 183 as shown in FIG. 12.

The combustion chamber 156 has a chamber 206 therein which is formed by vertical side surfaces 207 in each of the parts 157 and 158, horizontal top surfaces 208 in each of the parts 157 and 158 and convergent or upwardly inclined bottom surfaces 209 in each of the parts 157 and 158. The side surfaces 207, top surfaces 208 and bottom surfaces 209 all converge inwards to a nozzle throat area 210 and as shown in FIG. 12, the discharge of the nozzle 187 of the combustion products formed by the burning of the solid propellant 204 communicate with the discharge of air from the nozzle throat area 210 and an O-ring 211 seals the area about the nozzle 187 as shown in FIG. 12.

Figure 13:
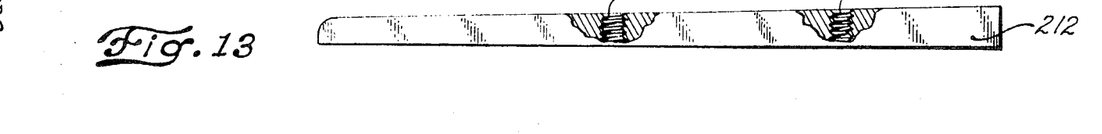
FIG. 13 is an elevational view, partly in section, of a wedge that is shown in dotted line position in FIG. 12.

The volume of the chamber 206 may be altered by mounting wedges 212 as shown in FIG. 13 by inserting bolts 213 through spaced opening 214 in the top of the part 157 to be received in internally threaded bores 215 in the wedges 212.

The part 158 is also provided with a plurality of inlets 216 which serve the same purpose as the inlets 144 as will be later described.

It is a well-known fact that air augmented propulsion systems involve the burning of a solid propellant grain in a primary combustion chamber exhausting the combustion products from the chamber into a secondary combustion chamber in which air is mixed with the combustion products and the combined mixture is exhausted through a nozzle to provide the desired thrust. A typical rocket motor of this type being exemplified in U.S. Pat. No. 3,173,249.

In order, therefore, to determine the characteristics displayed by certain types of solid propellant grains, there was a need for a test apparatus that could exactly duplicate the operation of an air augmented propulsion system in flight and the instant test apparatus was so designed and operates in the following manner.

It may be said that the basic component of the test apparatus is the equipment carriage 61 shown in FIG. 2.

The schematic of FIG. 1 depicts the system whereby air under pressure is fed to the equipment carriage 61 so that such air under pressure, as previously stated, may be fed to a secondary combustion chamber to duplicate the flight operation of an air augmented propulsion system.

In FIG. 2 it is shown how the air under pressure, as is supplied by the arrangement of the component of FIG. 1, is fed to the equipment carriage 61 by means of the conduit 35 and the description of FIG. 2 explains how the air is heated and then fed to the plenum chamber 94 under controlled velocity, pressure and temperature.

If the test is to be conducted for subsonic conditions, the secondary combustion chamber of FIGS. 5, 6 and 7 is connected to the plenum chamber 94 as described for FIGS. 3, 5, 6 and 7. A propellant sample A is ignited in a small rocket motor 95 which is connected to the plenum chamber 94 as previously described and the combustion products created by the burning of the sample A exhausts through the nozzle 116 into the plenum chamber 94 where it is mixed with the controlled air entering the plenum chamber 94 through the conduit 88 after it has been heated by the coil 79 in the equipment carriage 61, as previously described.

The combination of heated air and combustion products is then fed into the secondary combustion chamber 125. The mixture in the combustion chamber 125, because of the pressure and heat created by the heated air, will burn and such burning can be viewed through ports 137. Test equipment for pressure, temperature and velocity determinations may be connected to selected ports 144 and such equipment is determined by the operator conducting such tests. Nitrogen may also be introduced into the the combustion chamber 125 to purge the chamber 125 and thus increase the efficiency of the test. It will be understood that the mixture of combustion products and air in the chamber 125 will exhaust through the nozzle 151 and nozzles of various configurations and sizes may be used to change the ratio of thrust that is created by the burning of the products within the combustion chamber 125. This test is conducted at subsonic rates only.

Figure 11:
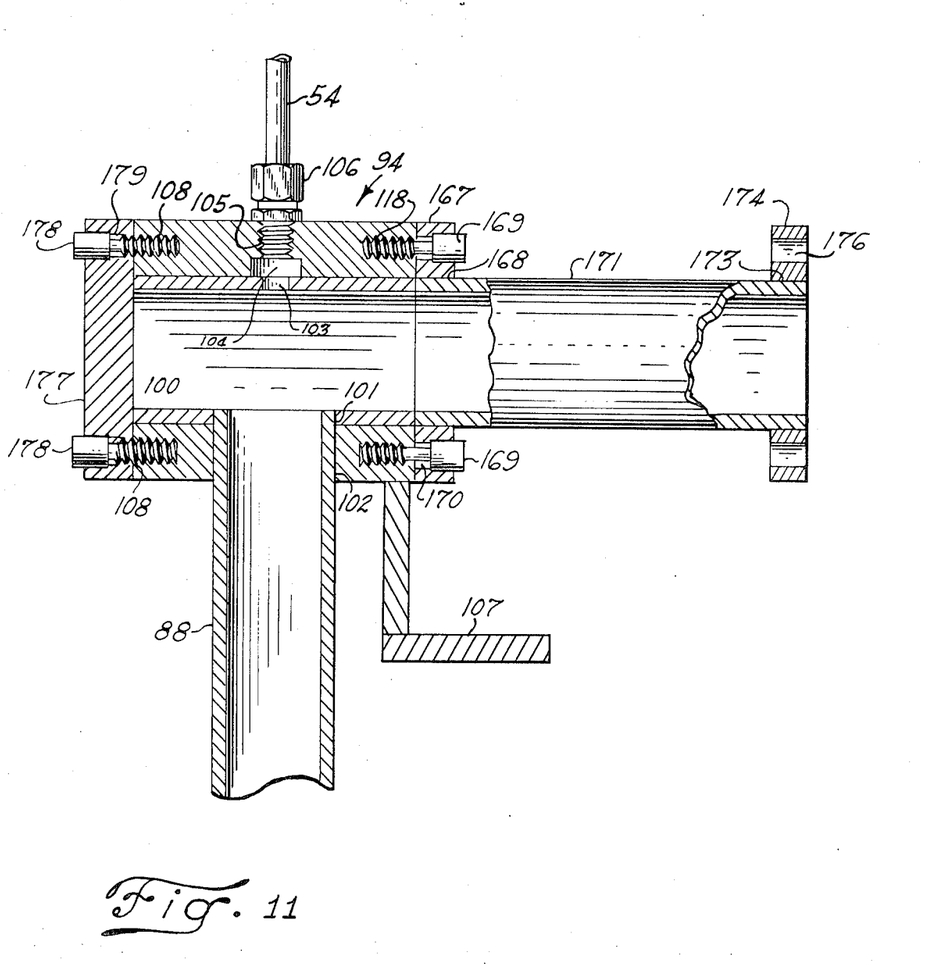
FIG. 11 is a sectional view, partly in elevation, partly broken away and taken on the line 11—11 of FIG. 10.

If supersonic tests are to be conducted the secondary combustion chamber 156 of FIGS. 10 to 15 inclusive is used and basically the test is the same, except that the rocket motor 180 is mounted on top of the secondary combustion chamber 156 and the plenum chamber 94 is connected to the chamber 156 as shown in FIG. 11.

As shown in FIGS. 10 and 12 the solid propellant grain 204 is ignited and combustion products formed by the burning thereof is exhausted through nozzle 187 into an air stream that is passing through nozzle 210 and the mixture thus created is forced by the generated pressure of combustion products and air pressure into the combustion chamber 156. The air stream coming from the plenum chamber 94 through conduit 171 will be travelling at supersonic velocity when it mixes with the combustion products. The results of the mixing of the combustion products and pressurized air may be viewed through ports 162 and the changing of various sizes of wedges 212 as shown in FIGS. 12 and 13 and selected instrumentations may be used to determine temperature, pressure and velocity within the combustion chamber 156.

Thus basically the test is the same whether or not the subsonic or the supersonic secondary combustion chamber is used. Photographic records can be obtained by utilizing the view ports and chamber pressures, temperatures and velocity can be measured by instrumentation both external and internal of the combustion chamber depending upon the tests that are being conducted.

A test apparatus has, therefore, been provided that can define trends in a secondary combustion chamber that will determine the proper solid propellant grain formulations that should be used to obtain desired operational requirements. The test apparatus also provides an excellent means for low cost solid propellant grain screening for air augmented propulsion systems.

It is believed also that from a study of the foregoing description the invention will be clear to one skilled in the art and it is to be understood that variations in the structure described and the methods of use of such structure may be adhered to provided such variations fall within the spirit of the invention and the scope of the appended claims.

Having thus described the invention what is claimed as new and desired to be secured by Letters Patent is:

1. A test apparatus for the combustion evaluation of air augmented solid propellant grains comprising a carriage, means for supplying air under pressure to said carriage, said carriage having means thereon for heating said air under pressure, a secondary combustion chamber mounted on said carriage, a plenum chamber connected to the means for supplying air and in communication with said secondary combustion chamber, a primary rocket motor in communication with said secondary combustion chamber having a sample of an air augmented solid propellant grain therein which when ignited will cause combustion products created by the burning thereof to be mixed with the air under pressure in said secondary combustion chamber.

2. A test apparatus as in claim 1 wherein the air under pressure is fed to said secondary combustion chamber at subsonic velocity.

3. A test apparatus as in claim 1 wherein air under pressure is fed to said secondary combustion chamber at supersonic velocity.

4. A test apparatus as in claim 1 wherein said primary rocket motor is mounted on the upper surface of said secondary combustion chamber.

5. A test apparatus as in claim 1 wherein said primary rocket motor is mounted on said plenum chamber in communication therewith.

6. A test apparatus as in claim 1 wherein wedges are mounted in said secondary combustion chamber to control the velocity of the combustion products and air under pressure.

7. A test apparatus as in claim 1 wherein viewing ports are provided in said secondary combustion chamber.

8. A test apparatus as in claim 1 wherein igniter means is provided for igniting the air augmented solid propellant grain in said primary rocket motor.

9. A test apparatus as in claim 1 wherein the chamber in said secondary combustion chamber is formed by a longitudinally extending tubular member.

10. A test apparatus as in claim 1 wherein the chamber in said secondary combustion chamber has vertical sidewalls, a horizontal upper wall and an inwardly inclined bottom wall that all converge toward a nozzle area at the head end of said secondary combustion chamber.

* * * * *